(12) United States Patent
Huang

(10) Patent No.: US 8,130,879 B2
(45) Date of Patent: Mar. 6, 2012

(54) APPARATUS AND METHOD FOR INTERFERENCE CANCELLATION IN RECEIVER OF COMMUNICATION SYSTEM

(75) Inventor: Fong Ching Huang, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 973 days.

(21) Appl. No.: 12/101,123

(22) Filed: Apr. 10, 2008

(65) Prior Publication Data

US 2008/0253489 A1 Oct. 16, 2008

(30) Foreign Application Priority Data

Apr. 16, 2007 (TW) ................................ 96113379 A

(51) Int. Cl.
*H03D 1/04* (2006.01)
(52) U.S. Cl. ... 375/346; 370/286; 370/289; 379/406.01; 379/406.05; 455/570
(58) Field of Classification Search ........................ None
See application file for complete search history.

(56) References Cited

U.S. PATENT DOCUMENTS

| | | | |
|---|---|---|---|
| 5,410,754 A * | 4/1995 | Klotzbach et al. ............ 370/466 |
| 5,990,820 A * | 11/1999 | Tan ................................ 341/161 |
| 6,266,367 B1 * | 7/2001 | Strait ............................ 375/229 |
| 2003/0091116 A1 * | 5/2003 | Yap et al. ...................... 375/247 |
| 2004/0213354 A1 * | 10/2004 | Jones et al. ................... 375/285 |
| 2006/0093128 A1 | 5/2006 | Oxford |

* cited by examiner

*Primary Examiner* — David C. Payne
*Assistant Examiner* — Adolf Dsouza
(74) *Attorney, Agent, or Firm* — Thomas, Kayden, Horstemeyer & Risley, LLP

(57) ABSTRACT

An apparatus and method for interference cancellation is provided to cancel the interference such as echo and crosstalk received by a receiver of a communication system. The apparatus includes a digital cancellation signal generator, a first canceller, and a second canceller. The digital cancellation signal generator can generate a digital cancellation signal, which includes a first and a second portion and represents an interference signal within a received signal. The first canceller can perform an analog cancellation on the received signal to output a partially-interference-canceled received signal according to the first portion of the digital cancellation signal. The second canceller can perform a digital cancellation on the partially-interference-canceled received signal according to the second portion of the digital cancellation signal.

23 Claims, 6 Drawing Sheets

APPARATUS AND METHOD FOR INTERFERENCE CANCELLATION IN RECEIVER OF COMMUNICATION SYSTEM

BACKGROUND OF THE INVENTION (a). Field of the Invention

The invention relates to communication systems, and more particularly to an apparatus and method for interference cancellation used in the communication systems.

(b). Description of the Prior Arts

In a full duplex communication system, since the transmission and reception of signals are performed simultaneously in the same channel, a transceiver will receive the signal transmitted by a remote transceiver and the echo signal transmitted by the transceiver itself. Besides, if the full duplex communication system includes multiple channels, such as the Ethernet communication system, then the receiver will further receive the cross-talk resulted from the transmitted signal within another channel. The echo and cross-talk can degrade the performance of the receiver, thus how to cancel the echo and cross-talk is very important for the communication system.

In prior arts, digital cancellation is used to cancel the echo and cross-talk. FIG. 1 is a diagram showing the architecture used in prior arts to cancel the echo and cross-talk. In FIG. 1, an analog-to-digital converter (ADC) 12 receives an analog received signal and converts it into a digital received signal. An echo/cross-talk canceller generates a cancellation signal corresponding to the echo or cross-talk, and an adder 13 subtracts the cancellation signal from the digital received signal so as to cancel the echo or cross-talk.

However, when the transmission rate of the communication system is high, the specification request for the ADC 12 is also raised. For example, a 10 Gbps Ethernet receiver requires at least 10-bit ADCs operated at the rate of at least 800 MHz, which is difficult to design and implement. In particular, the Ethernet transceiver simultaneously receives a transmitted signal from a remote transmitter and an echo signal from it's own transmitter, the power of which is much larger than that of the transmitted signal. In order to completely receive these two signals, the dynamic range and effective number of bits (ENOB) of the ADC must be large enough, but this is very difficult to design for system designers. Thus, the conventional approach to echo/cross-talk cancellation in digital domain has the drawback of severe requirement of ADC specification.

SUMMARY OF THE INVENTION

It is therefore one objective of the invention to provide an apparatus and method for interference cancellation which can combine analog cancellation and digital cancellation to cancel the interference, such as echo, cross-talk, etc., received by the receiver of a communication system, thereby avoiding the problem of the prior arts.

In one embodiment of the invention, an apparatus for interference cancellation used in a receiver of a transceiver of a communication device is provided. The apparatus comprises: a digital cancellation signal generator for generating a digital cancellation signal comprising a first digital signal and a second digital signal, wherein the digital cancellation signal represents an interference signal within a received signal of the receiver; a first canceller, coupled to the digital cancellation signal generator, for performing an analog cancellation on the received signal in an analog domain according to the first digital signal to output a first canceled received signal; and a second canceller, coupled to the digital cancellation signal generator and the first canceller, for performing a digital cancellation on the first canceled received signal in a digital domain according to the second digital signal to output a digital output signal.

In another embodiment of the invention, a method for interference cancellation used in a receiver of a communication system is provided. The method comprises: receiving a received signal using a hybrid circuit; in the receiver, generating a digital cancellation signal comprising a first digital signal and a second digital signal, wherein the digital cancellation signal represents an interference signal within the received signal; in the receiver, converting a first digital signal into a first analog signal; in the receiver, performing an analog cancellation on the received signal in an analog domain according to the first analog signal to output an analog partially-interference-canceled signal; in the receiver, converting the analog partially-interference-canceled signal into a digital partially-interference-canceled signal; and in the receiver, performing a digital cancellation on the digital partially-interference-canceled signal according to the second digital signal to output an digital output signal.

DETAILED DESCRIPTION OF THE INVENTION

Figure 2:
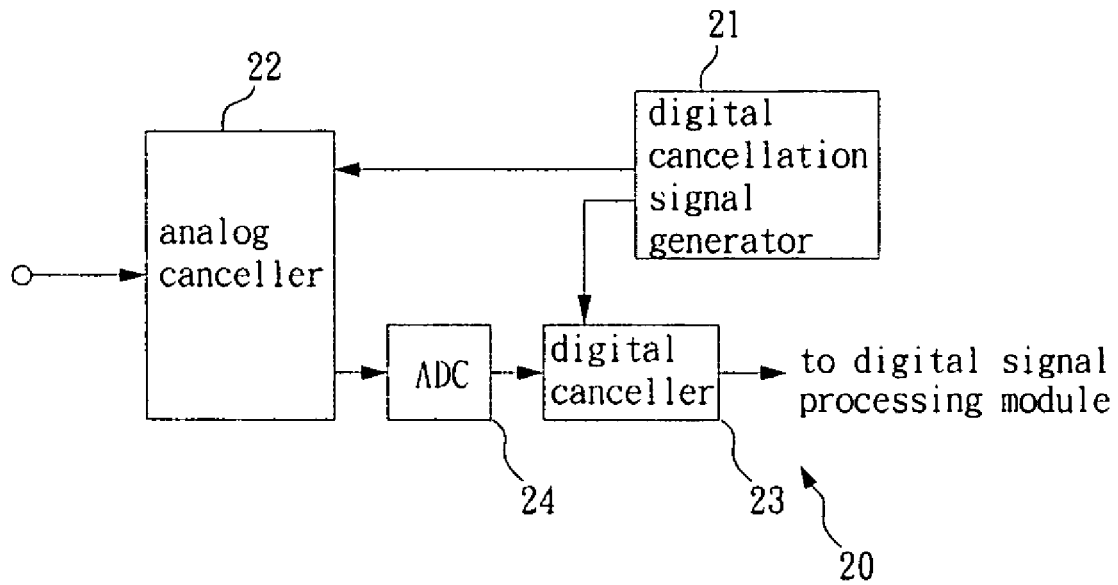
FIG. 2 is a block diagram of an embodiment of the apparatus for interference cancellation according to the invention.

FIG. 2 is a block diagram of an embodiment of the apparatus for interference cancellation according to the invention. In FIG. 2, the apparatus 20 for interference cancellation is used in a receiver of a communication system (for examples, a 1 Gbps or 10 Gbps Ethernet device). The apparatus 20 of the receiver includes a digital cancellation signal generator 21, an analog canceller 22, a digital canceller 23 and an ADC 24. The digital cancellation signal generator 21 generates a digital cancellation signal representing an interference signal of a received signal, where the digital cancellation signal is used to cancel the interference signal out of the received signal before and after the ADC 24. The digital cancellation signal includes a first portion and a second portion. The first portion of the digital cancellation signal is provided to the analog canceller 22, while the second portion of the digital cancellation signal is provided to the digital canceller 23. The analog canceller 22 converts the first portion of the digital cancellation signal into an analog cancellation signal, and performs a first interference cancellation on the analog received signal from a hybrid circuit (not shown in FIG) according to the analog cancellation signal to output an analog partially-interference-canceled received signal, which is then provided to the ADC 24. The ADC 24 converts the analog partiallyinterference-canceled received signal from the analog canceller 22 into a digital partially-interference-canceled received signal. The digital canceller 23 receives the digital partially-interference-canceled received signal from the ADC 24 and the second portion of the digital cancellation signal from the digital cancellation signal generator 21, and performs a second interference cancellation on the digital partially-interference-canceled received signal according to the second portion of the cancellation signal. In this embodiment of this invention, the SNR of the analog partially-interference-canceled received signal can be improved such that the loading of the ADC 24 will be reduced, the SNR of the received signal can be improved, and the performance of the receiver will be improved. After the first and second interference cancellations are performed, the result (i.e. the output of the digital canceller 23) is provided to a digital signal processing module for subsequent processing.

Preferably, the first interference cancellation is an analog cancellation and the second interference cancellation is a digital cancellation. That is, the apparatus 20 for interference cancellation can combine the analog cancellation and the digital cancellation to perform a mixed-mode (digital+analog) cancellation.

In one embodiment, the interference signal comprises an echo signal, and the digital cancellation signal generator 21 comprises an echo canceller. For instance, a transmitted signal in the same channel of a full duplex Ethernet device would generate an echo signal, and the digital cancellation signal generator 21 can generate a cancellation signal including an echo cancellation signal according to a digital transmitted signal from a transmitter in the same channel so as to cancel the echo signal. In another embodiment, the interference signal comprises a cross-talk signal, and the digital cancellation signal generator 21 comprises a plurality of cross-talk cancellers. For instance, in a 1 Gbps or 10 Gbps Ethernet device, all four channels transmit and receive signals simultaneously, and for any one of the four channels, a transmitted signal in another channel would generate a cross-talk signal. Three cross-talk cancellers of the digital cancellation signal generator 21 respectively generate a corresponding digital cross-talk cancellation signal according to the digital transmitted signal before ADC of a transmitter in a different channel so as to cancel the cross-talk signal. In an embodiment, the cross-talk cancellation signal comprises a near-end cross-talk cancellation signal and a far-end cross-talk cancellation signal. In a preferred embodiment, the digital cancellation signal generator 21 comprises an echo canceller, three near-end cross-talk cancellers, and three far-end cross-talk cancellers. The digital cancellation signal from the digital cancellation signal generator 21 comprises an echo cancellation signal, near-end and far-end cross-talk cancellation signals. In an embodiment, the echo canceller comprises an adaptive digital filter. In an embodiment, the far-end cross-talk canceller comprises an adaptive digital filter. In an embodiment, the near-end cross-talk canceller comprises an adaptive digital filter.

Figure 3:
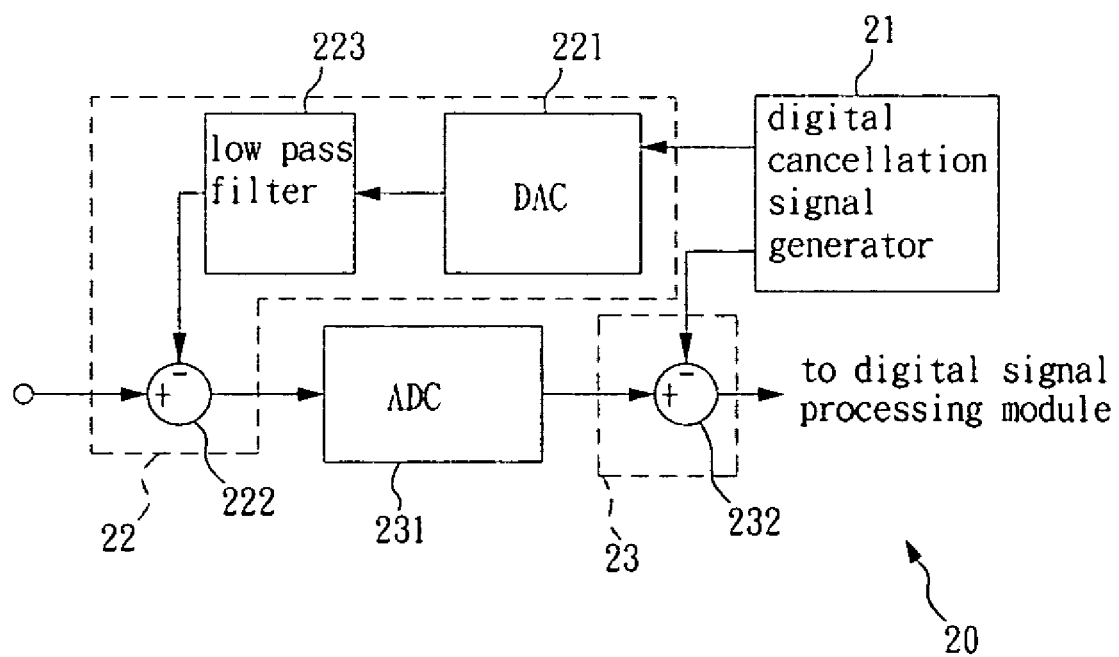
FIG. 3 is a block diagram of a preferred embodiment of the apparatus for interference cancellation of FIG. 2.

FIG. 3 is a block diagram of a preferred embodiment of the apparatus 20 of FIG. 2. In FIG. 3, the analog canceller 22 in the receiver includes a digital-to-analog converter (DAC) 221, a low pass filter 223 and an adder 222. The DAC 221 is coupled to the digital cancellation signal generator 21, and converts the first portion of the digital cancellation signal into the analog cancellation signal which can be a current type or a voltage type. Then, the low pass filter 223 performs a low pass filtering on the analog cancellation signal so as to remove the aliasing high frequency components resulted from the DAC 221. The adder 222 subtracts the filtered analog cancellation signal from the analog received signal from the hybrid circuit so as to perform the analog cancellation (first cancellation procedure), and outputs the partially-interference-canceled received signal to an ADC 231. The ADC 231 converts the partially-interference-canceled received signal outputted by the analog canceller 22 into a digital received signal. The digital canceller 23 is coupled to the ADC 231 and includes an adder 232. The adder 232 subtracts the second portion of the digital cancellation signal, outputted by the digital cancellation signal generator 21, from the digital received signal from the ADC 231 so as to perform the digital cancellation (second cancellation procedure).

Figure 1:
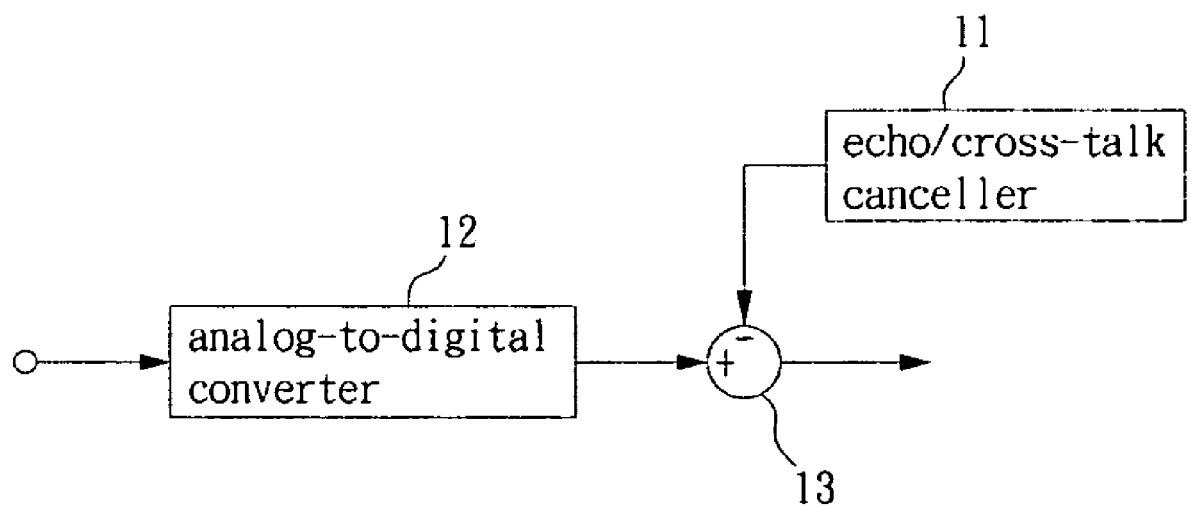
FIG. 1 is a diagram showing the architecture used in prior arts to cancel the echo and cross-talk.

In the embodiment of FIG. 3, the first portion of the digital cancellation signal contains at least one most significant bit (MSB) of the digital cancellation signal generated by the digital cancellation signal generator 21, and the second portion of the digital cancellation signal contains the remaining bits of the digital cancellation signal. For example, if the digital cancellation signal is a ten-bit cancellation data, then the first three MSBs can be used as the first portion of the digital cancellation signal and the remaining seven bits as the second portion of the digital cancellation signal. Thus, a portion of interference can be first canceled in analog manner, thereby reducing the loading of the subsequent ADC 231 in FIG. 3 (ADC 24 of FIG. 2) and improving signal integrity and SNR of signal. To process the same 10-bit digital cancellation signal, the conventional approach (e.g. FIG. 1) needs a 10-bit ADC, while the present example just needs a 7-bit ADC.

Figure 4:
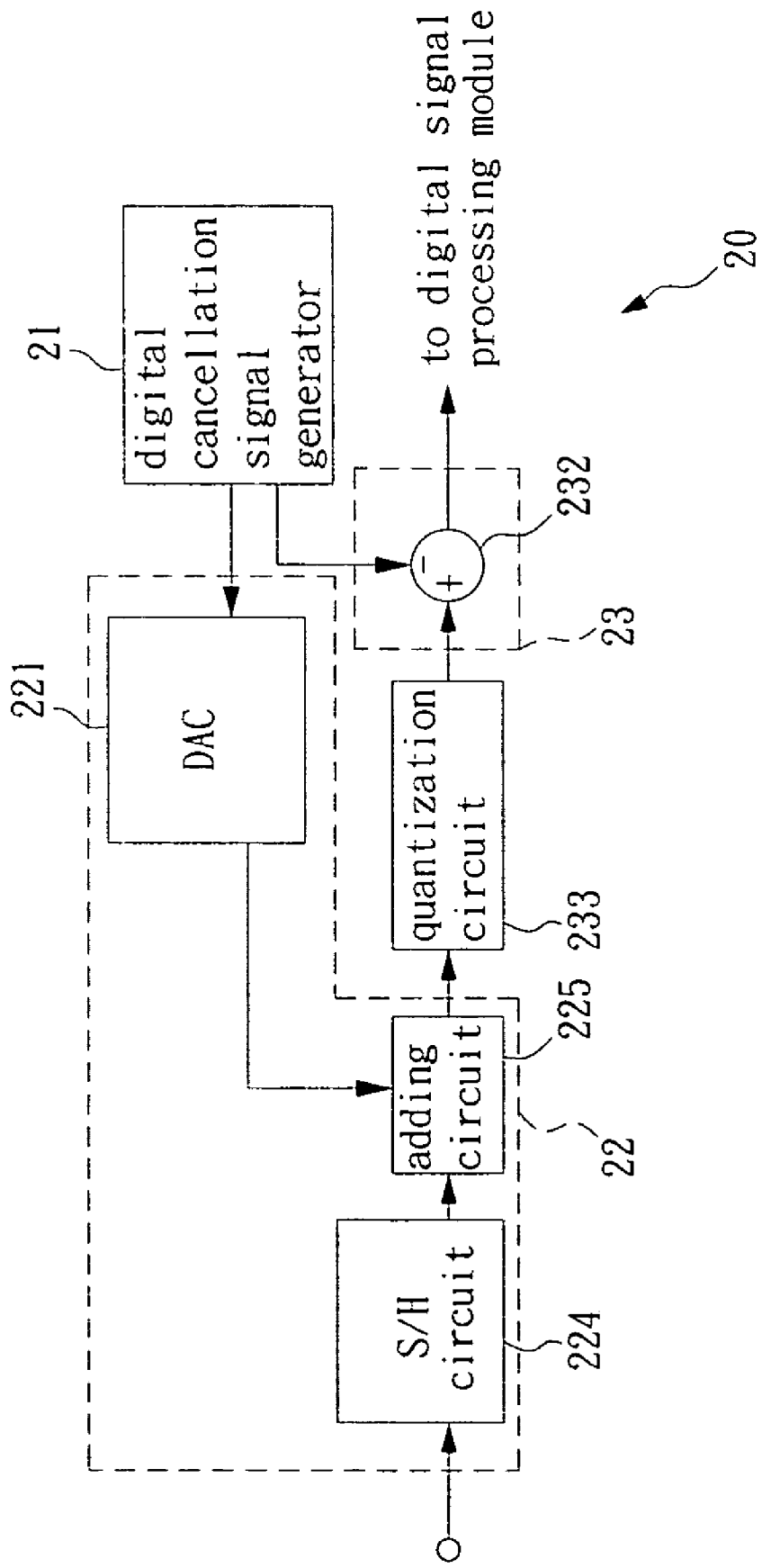
FIG. 4 is a block diagram of another preferred embodiment of the apparatus for interference cancellation of FIG. 2.

FIG. 4 is a block diagram of another preferred embodiment of the apparatus 20 in the receiver of FIG. 2. In FIG. 4, the analog canceller 22 includes a DAC 221, an adding circuit 225 and a sample-and-hold (S/H) circuit 224. The DAC 221 converts the first portion of the digital cancellation signal into the analog cancellation signal, which comprises a plurality of discrete-time voltage or current values. The discrete-time S/H circuit 224 samples the analog received signal from the hybrid circuit to output a corresponding discrete-time signal. The adding circuit 225 subtracts the corresponding discrete-time voltage or current value of the analog cancellation signal from the sampled signal, so as to perform the analog cancellation. In other words, the analog canceller 22 performs the cancellation in discrete-time domain rather than continuous-time domain. In this manner, good performance of analog cancellation can be achieved without using the low pass filter to remove the high frequency components resulted from the DAC 221. The quantization circuit 233 converts the output of the adding circuit 225 into a digital received signal. Besides, the digital canceller 23 comprises an adder 232. The adder 232, coupled to the digital cancellation signal generator 21 and the quantization circuit 233, subtracts the second portion of the digital cancellation signal from the digital received signal from the quantization circuit 233.

Figure 5:
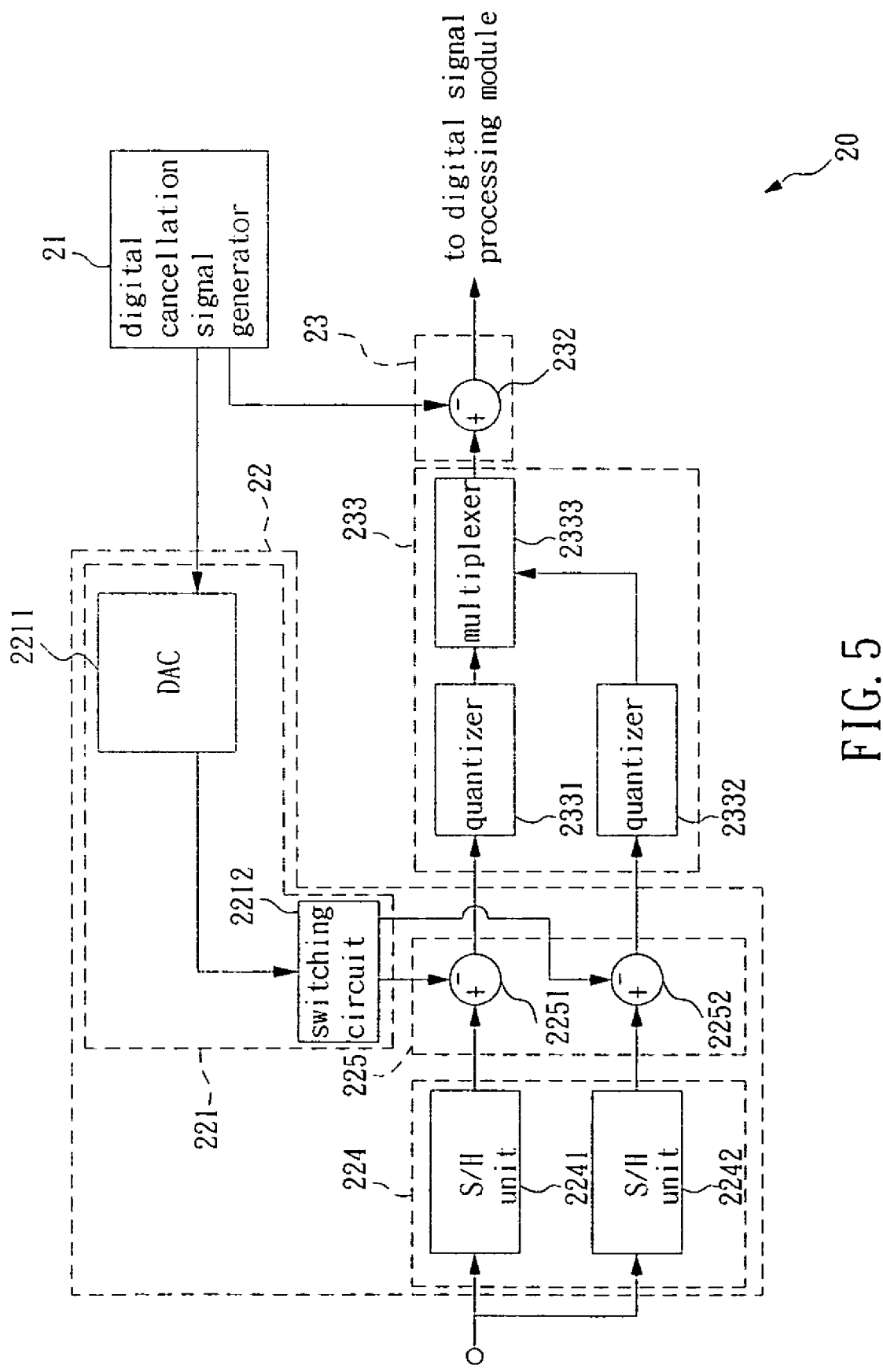
FIG. 5 is a detailed block diagram of a preferred embodiment of the apparatus for interference cancellation of FIG. 4.

In a preferred embodiment, since high-speed ADC and DAC circuits are not easy to design and manufacture, this invention can also be implemented by using a time-interleaved ADC or DAC. In the time-interleaved ADC (or DAC), multiple low-speed ADCs (or DACs) operate parallelly to achieve equivalent high-speed analog-to-digital conversions (or digital-to-analog conversions). FIG. 5 is a detailed block diagram of a preferred embodiment of the apparatus 20 of FIG. 4. For examples, in the analog canceller 22 of FIG. 5, the S/H circuit 224 includes N S/H units, and the adding circuit 225 includes N adders, where N is larger than one. For the sake of simplification, N=2 is taken as an example in FIG. 5. The S/H units 2241 and 2242 sample the analog received signal and output the corresponding discrete-time signal to the adders 2251 and 2252 in a time-interleaved manner. For instance, the S/H unit 2241 performs sampling and outputs the sampled value to the adder 2251 during $1^{st}, 3^{rd}, 5^{th}$ ... clocks; the S/H unit 2242 performs sampling and outputs the sampled value to the adder 2252 during $2^{nd}, 4^{th}, 6^{th}$ ... clocks. The DAC circuit 221 includes a DAC 2211 and a switching circuit 2212. The DAC 2211 converts the first portion of the digital cancellation signal into the analog discrete-time cancellation signal. The switching circuit 2212 includes N output terminals respectively coupled to the N adders of the adding circuit 225. The switching circuit 2212 outputs the analog discrete-time cancellation signal to the N adders in the time-interleaved manner mentioned above. For instance, in FIG. 5, the switching circuit 2212 provides the odd number voltage or current values of the analog cancellation signal to the adder 2251 and the even number voltage or current values to the adder 2252. The adders 2251 and 2252 respectively subtract the odd and even voltage or current values from the analog discrete-time cancellation signal so as to perform the analog cancellation, and output the result to the quantization circuit 233.

In this embodiment, the quantization circuit 233 includes N quantizers 2331 and 2332 (taking N=2 as example) and a multiplexer 2333. The quantizers 2331 and 2332 respectively receive the analog outputs of the adders 2251 and 2252, convert them into the digital received signal, and output the digital received signal in the time-interleaved manner mentioned above. For instance, the quantizer 2331 outputs during the odd number clocks, and the quantizer 2332 outputs during the even number clocks. During each clock, the multiplexer 2333 selects one quantizer for output according to the output order of the quantizers 2331 and 2332, thereby combing the outputs during the odd and even number clocks as the complete digital received signal. The adder 232 of the digital canceller 23 subtracts the second portion of the digital cancellation signal provided by the digital cancellation signal generator 21 from the digital received signal outputted by the multiplexer 2333, so as to perform the digital cancellation. In the time-interleaved manner described above, this embodiment in FIG. 5 can double the rate of ADC by using two quantizers. The more quantizers are used, the more times the conversion rate is increased.

Figure 6:
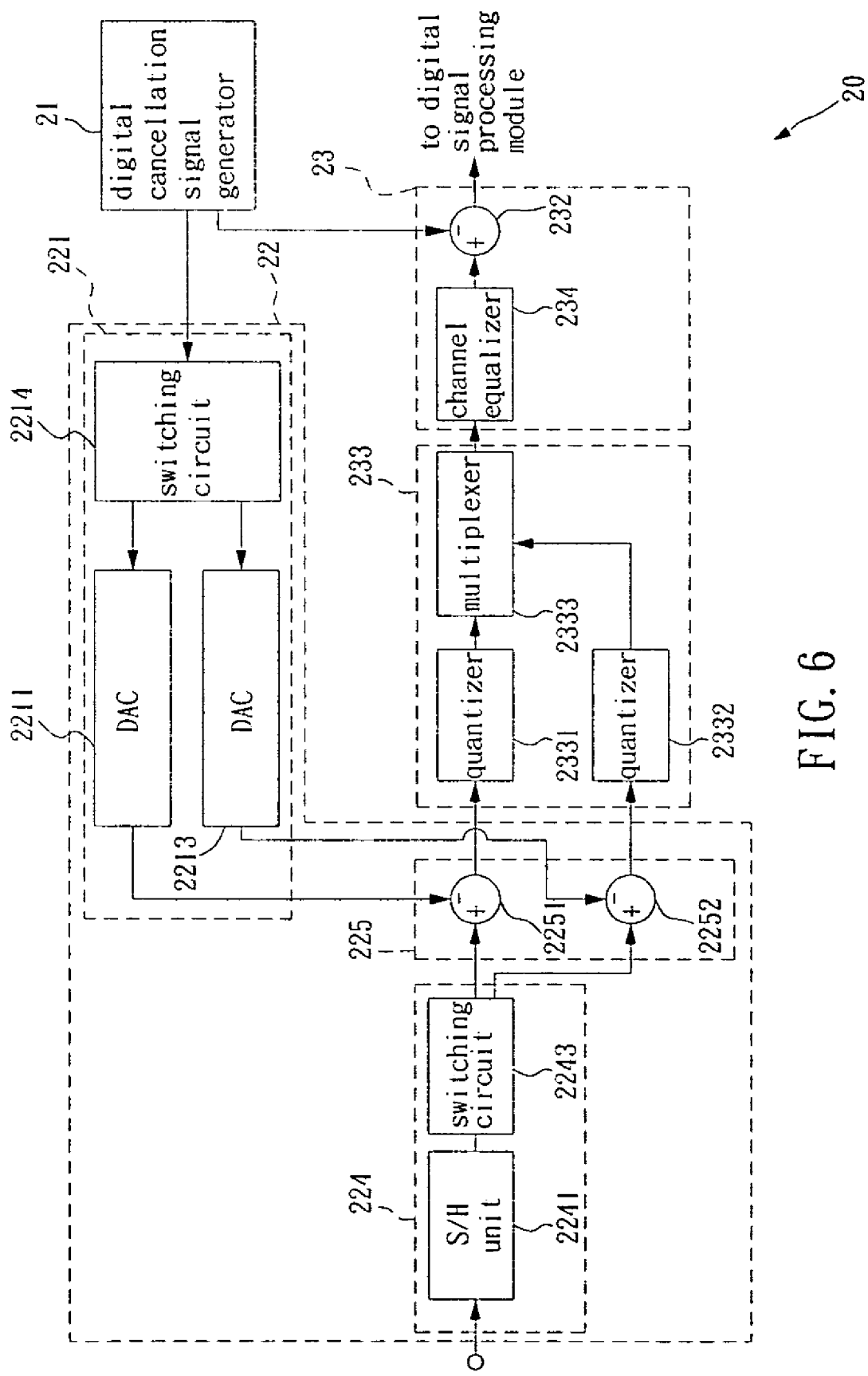
FIG. 6 is a detailed block diagram of another preferred embodiment of the apparatus for interference cancellation of FIG. 4.

In FIG. 6, the DAC 221 can also be implemented by N time-interleaved DACs, and the S/H circuit 224 can also be implemented by a high-speed S/H 2241 and a switching circuit 2243. In FIG. 6, the time-interleaved DAC 221 includes N DACs 2211 and 2213 (taking N=2 as example) and a switching circuit 2214. The switching circuit 2214 provides the first portion of the digital cancellation signal, outputted by the digital cancellation signal generator 21, to the DACs 2211 and 2213 in a time-interleaved manner. For instance, the odd number digital values of the first cancellation signal are provided to the DAC 2211, and the even number digital values are provided to the DAC 2213. Then, the DACs 2211 and 2213 output the conversion result (i.e. the analog cancellation signal) to the adders 2251 and 2252. In this way, the rate of digital-to-analog conversion can be doubled by using two DACs. The more DACs are used, the more times the conversion rate is increased. Besides, in the S/H circuit 224, the switching circuit 2243 provides the discrete-time signal outputted by the S/H unit 2241 to the adders 2251 and 2252.

In an embodiment, the digital canceller 23 further comprises a channel equalizer 234, coupled to the adder 232, for removing the channel response, generated during the process of channel transmission, within the digital received signal outputted by the multiplexer 2333. In one embodiment, the channel equalizer 234 is coupled after the adder 232. In another embodiment, the adder 232 is integrated into the channel equalizer 234 such that the digital cancellation can be performed during the process of channel equalization. Similarly, in FIGS. 3, 4 and 5, the digital canceller 23 can also include the channel equalizer 234, and the adder 232 can be coupled before or after the channel equalizer 234, or integrated into the channel equalizer 234.

In FIGS. 3, 4, 5 and 6, the adder 232 is located before the digital signal processing module. In one embodiment, the adder 232 is integrated into the digital signal processing module, or coupled after the digital signal processing module.

In FIG. 3, the DAC 221 can also be implemented by using the time-interleaved DAC, and the ADC 231 can also be implemented by using the time-interleaved ADC.

Figure 7:
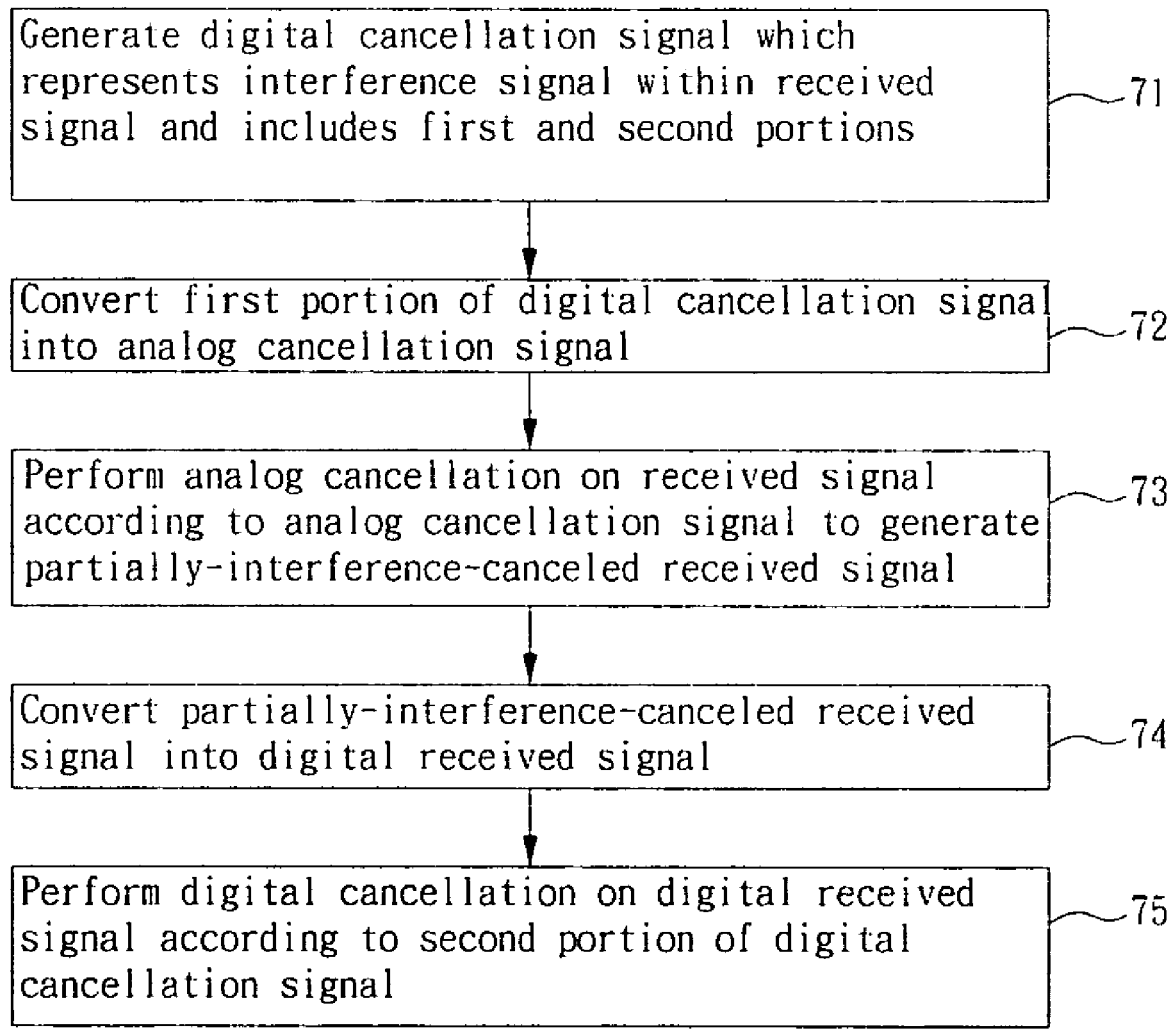
FIG. 7 is a flow chart of the method for interference cancellation according to a preferred embodiment of the invention.

FIG. 7 is a flow chart of the method for interference cancellation according to a preferred embodiment of the invention. Since the related steps of this preferred embodiment have been described in detail as above, the description for these steps is omitted here.

In one embodiment, the apparatus for interference cancellation of this invention conforms to at least one of the following network specifications: 10 Gbps Ethernet, 1 Gbps Ethernet (IEEE 802.3), Virtual Local Area Network (VLAN) (IEEE 802.1Q), etc. In order to conform to the above network specifications, the apparatus for interference cancellation of this invention further includes other circuits, such as a Carrier Sense Multiple Access with Collision Detection (CSMA/CD) circuit for implementing the CSMA/CD function, or a Cyclic Redundancy Check (CRC) circuit for detecting possible data errors occurred during packet transmission. These circuits are well known to people skilled in the art, and will not be explained here.

While the present invention has been shown and described with reference to the preferred embodiments thereof and in terms of the illustrative drawings, it should not be considered as limited thereby. Various possible modifications and alterations could be conceived of by one skilled in the art to the form and the content of any particular embodiment, without departing from the scope and the spirit of the present invention.

What is claimed is:

1. An apparatus for interference cancellation used in a receiver of a transceiver of a communication device, the apparatus comprising:
   a digital cancellation signal generator for generating a digital cancellation signal comprising a first digital signal and a second digital signal, wherein the digital cancellation signal represents an interference signal within a received signal received by the receiver;
   a first canceller, coupled to the digital cancellation signal generator, for performing an analog cancellation on the received signal in an analog domain according to the first digital signal to output a first canceled received signal, wherein the first canceller performs the analog cancellation in a discrete-time domain to remove a plurality of high frequency components; and
   a second canceller, coupled to the digital cancellation signal generator and the first canceller, for performing a digital cancellation on the first canceled received signal in a digital domain according to the second digital signal to output a digital output signal.

2. The apparatus of claim 1, wherein the interference signal comprises an echo signal, and the digital cancellation signal generator comprises an echo canceller.

3. The apparatus of claim 2, wherein the interference signal further comprises at least one cross-talk signal, and the digital cancellation signal generator further comprises at least one cross-talk canceller.

4. The apparatus of claim 1, wherein the interference signal comprises an echo signal, and a plurality of near-end and far-end cross-talk signals.

5. The apparatus of claim 1, wherein the first digital signal is larger than the second digital signal.

6. The apparatus of claim 1, wherein the first digital signal is at least one most significant bit (MSB) of the digital cancellation signal.

7. The apparatus of claim 6, wherein the first canceller comprises:
a digital-to-analog converter for converting the first digital signal into a first cancellation signal;
a sample-and-hold circuit for sampling the received signal in the analog domain; and
a first adder for subtracting the first cancellation signal from the received signal.

8. The apparatus of claim 7, wherein the first canceller further comprises: a low pass filter, coupled between the digital-to-analog converter and the first adder, for low pass filtering the first cancellation signal.

9. The apparatus of claim 7, wherein the digital-to-analog converter is a time-interleaved digital-to-analog converter.

10. The apparatus of claim 7, wherein the first cancellation signal comprises:
at least one of a plurality of discrete-time voltage values and a plurality of discrete-time current values.

11. The apparatus of claim 1, further comprising:
an analog-to-digital converter, coupled to the second canceller, for converting the first canceled received signal outputted by the first canceller into a digital first canceled signal;
wherein the second canceller comprises an adder for subtracting the second digital signal from the digital first canceled signal.

12. The apparatus of claim 11, wherein the analog-to-digital converter is a time-interleaved analog-to-digital converter.

13. The apparatus of claim 11, wherein the first canceller comprises a sample-and-hold circuit and the analog-to-digital converter comprises a quantization circuit.

14. The apparatus of claim 13, wherein the quantization circuit is a time-interleaved quantization circuit.

15. The apparatus of claim 14, wherein the sample-and-hold circuit is a time-interleaved sample-and-hold circuit.

16. The apparatus of claim 1, wherein the communication device comprises a Cyclic Redundancy Check (CRC) circuit, and a Carrier Sense Multiple Access with Collision Detection (CSMA/CD) circuit for implementing the CSMA/CD function.

17. A method for interference cancellation used in a receiver of a communication system, the method comprising steps of:
receiving a received signal using a hybrid circuit;
in the receiver, generating a digital cancellation signal comprising a first digital signal and a second digital signal, wherein the digital cancellation signal represents an interference signal within the received signal;
in the receiver, converting a first digital signal into a first analog signal comprising at least one of a plurality of discrete-time voltage values and a plurality of discrete-time current values, wherein the converting is performed in a discrete-time domain and to remove a plurality of high frequency components;
in the receiver, performing an analog cancellation on the received signal in an analog domain according to the first analog signal to output an analog partially-interference-canceled signal;
in the receiver, converting the analog partially-interference-canceled signal into a digital partially-interference-canceled signal; and
in the receiver, performing a digital cancellation on the digital partially-interference-canceled signal according to the second digital signal to output an digital output signal.

18. The method of claim 17, wherein the digital cancellation signal comprises at least one of an echo cancellation signal and a cross-talk cancellation signal.

19. The method of claim 17, wherein the first digital signal is at least one most significant bit (MSB) of the digital cancellation signal.

20. The method of claim 17, further comprising:
low-pass filtering the first analog signal.

21. The method of claim 17, wherein the step of performing the analog cancellation comprises
sampling the received signal to output a corresponding discrete-time signal; and
generating the analog partially-interference-canceled signal according to the first analog signal and the discrete-time signal.

22. The method of claim 17, wherein the step of converting the first digital signal is executed by a time-interleaved digital-to-analog converter.

23. The method of claim 17, wherein the step of converting the analog partially-interference-canceled signal is executed by a time-interleaved analog-to-digital converter.

* * * * *